July 10, 1951        G. W. CARLSON        2,560,413
DOWEL
Filed Feb. 26, 1949
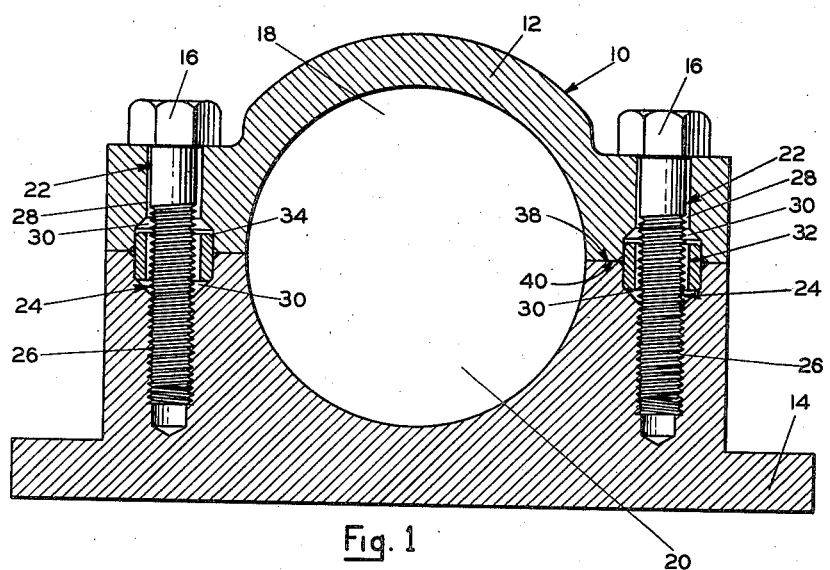
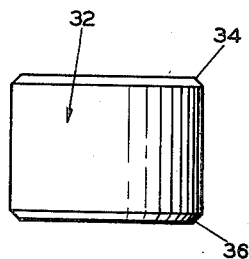
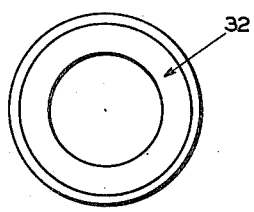
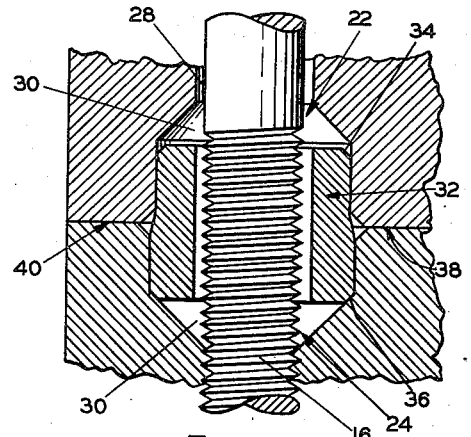
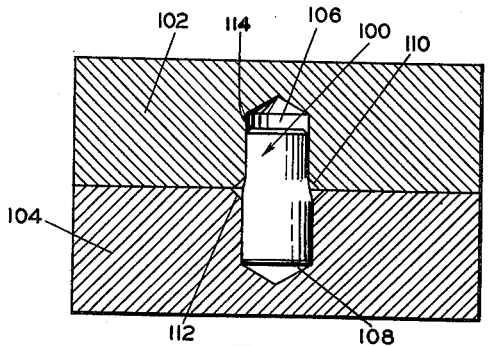
*INVENTOR.*
GUSTAV W. CARLSON
BY
*McDonald & Teagno*
ATTORNEYS Patented July 10, 1951

2,560,413

UNITED STATES PATENT OFFICE 2,560,413

DOWEL

Gustav W. Carlson, Cleveland Heights, Ohio, assignor to Eaton Manufacturing Company, Cleveland, Ohio, a corporation of Ohio Application February 26, 1949, Serial No. 78,571

8 Claims. (Cl. 308—74)

This invention relates to dowel members and more particularly to their utilization in the assembly of two members together.

Broadly the invention comprehends the provision of dowel members made of a ductile material permitting of the deformation thereof for use in the joining of two members together in proper desired alignment or arrangement without the necessity of maintaining close tolerance dimensions either of size or position between the dowel holes of the respective members and wherein the dowel members possess sufficient strength and rigidity to maintain the initial established arrangement between the members regardless of repeated separation and reassembly thereof.

Although members requiring establishment of aligned arrangement between one another, that has to be properly maintained for the life use of the members regardless of subsequent servicing, disassembly, and reassembly thereof have been fabricated in the past, it has required the maintenance of close machining tolerances resulting in increased manufacture cost. Through the provision of dowel members possessing characteristics of being deformable to correct for inaccuracies of machining between mating dowel holes and yet having sufficient strength to maintain their established deformation as required to align two members adapted to be joined together, the cost incident to maintaining close tolerances between mating dowel holes requiring the reaming of said holes and the close machining of the external surfaces of the dowel members or the like to be received therein is greatly reduced while producing a comparable assembled structure.

An object of the invention is the provision of an assembly of cooperating members maintainable to a desired arrangement therebetween by a ductile dowel member having a diameter slightly greater than the maximum diameter of the dowel hole in either member, said dowel member susceptible of deformation to correct for inaccuracies of machining between the associated dowel holes of the members and effective to provide for the established alignment therebetween after any disassembly and reassembly thereof.

Another object of the invention is the provision of a simple, economical, and effective means of aligning two members relative to one another wherein permanent established alignment therebetween is necessary regardless of the subsequent disassembly or reassembly of the members.

Another object of the invention is the provision of a dowel member possessing characteristics of being deformable to a predetermined limit for use in the alignment of members one to another without the necessity of maintaining close tolerance machining of the dowel holes between the members either as to size or alignment.

A further object of the invention is the provision of a method for fabricating two cooperating members requiring permanent alignment therebetween for the proper life use thereof comprising forming a member having a dowel hole therein, press fitting a dowel member made of ductile material and susceptible of deformation into the dowel hole and allowing a portion thereof to extend beyond the member in which it is pressed, and then taking a second member, adapted to cooperate with the first member, having a dowel hole therein having a diameter smaller than the diameter of the dowel member extending from the first member and clamping the second member into desired alignment with the first member with the hole of the second member receiving the extended part of the dowel member therein in press fitted relation.

A yet further object of the invention is the provision of dowel members, such as dowel bushings or the like for use in the fabrication of two cooperating members together, such as a bearing cap and pedestal assembly or the like, one or both of which is susceptible to warping and wherein the proper alignment and close fitting therebetween is required at all times after the initial machining fit therebetween, said bushings being deformable to correct for any inaccuracies of machining occurring between the associated dowel holes of the cap and pedestal and yet possessing sufficient strength to overcome the warping of the cooperating members and provide for the close fitting relation between the cooperating members for any disassembly or reassembly of the members.

Other objects and advantages of the invention will appear from the following description taken in connection with the drawings, forming a part of the specification, and in which:

Fig. 1 is a vertical cross-sectional view of a bearing cap and pedestal assembly embodying the invention;

Fig. 2 is a side plan view of a dowel bushing utilized in the assembly of Fig. 1;

Fig. 3 is a an end plan view of Fig. 2;

Fig. 4 is an enlarged fragmentary cross-sectionalized view illustrating the assembly of the cap and pedestal of Fig. 1 in assembled relation to the dowel bushing utilized to maintain alignment therebetween wherein the bushing is shown in deformed condition; and Fig. 5 is a fragmentary cross-sectionalized view of an assembly of aligned cooperating members utilizing a ductile, deformable dowel pin, as an aligning means therebetween.

The invention is directed at the provision of a method of fabricating two members together utilizing a ductile, deformable dowel as the alignment establishing means therebetween and wherein it is not necessary to maintain close tolerance machining dimensions between the associated dowel holes of the respective cooperating members to be fabricated. By providing a dowel member, whether it be a pin or a bushing, of ductile material which possesses qualities permitting of the deformation thereof it is possible to economically provide for the fabrication of two members which would otherwise require close machining tolerances between the dowel body and dowel holes for establishing a fixed relationship between members requiring an established positioning relative to one another. It is readily conceivable in view of the ductility of the dowel member that the dowel holes to receive same need not be in either alignment or of a like size as it is the premise herein that the dowels shall properly deform themselves to the associated relation of the holes and thereby attain a shape determinate of an established position between the cooperating members. Although the dowel members as herein defined are adaptable for use in aligning several different arrangements of cooperative parts or members together, they are especially useful in the fabrication of refittable parts, that is, parts requiring repeated servicing necessitating the disassembly and reassembly thereof, such as, bearing cap and pedestal assemblies and the like.

Through the use of dowel bushings, a positive assurance of the alignment of the bearing sections is achieved effective to correct for the tendency of the bearing sections to change in shape or warp after the machining thereof and the removal of the cap screw bolts therefrom. The use of the dowel bushings also presents an economical and effective manner for accomplishing the desired result as compared to the costly method of reaming the hole for the cap screws and machining the body of the cap screws to fit the holes as has heretofore been practiced.

Referring to Fig. 1 of the drawings for more particular details of the invention, 10 represents generally a bearing assembly comprising a bearing cap 12, a bearing base or pedestal 14 and a pair of cap screws 16 holding the bearing half section members 12 and 14 in assembled clamped position upon one another.

The bearing base 14 is provided with a semicircular opening 20, adapted to mate with a similar opening 18 formed in cap 12, said openings being machined as a unit after the initial assembly of the cap and base together, and a pair of stepped bores 24 one arranged on each side of opening 20.

The cap 12 in addition to the opening 18 has a pair of stepped bores 22 one arranged on each side of the opening 18 adapted to be mated with bores 24 and through which the cap screws 16 extend into the threaded relation with the smaller diametered threaded portions 26 of bores 24 but without interference with the walls of the smaller diametered unthreaded portions 28 of bores 22 through the provision of clearance therebetween.

The cap 12 and base 14 are each provided with enlarged counterbores 30 forming portions repsectively of the bores 22 and 24 and arranged on the sides of the cap and base in adjacent opposed relation to one another. The bores 30 are adapted to receive in press fitted relation therein dowel bushings 32, said bushings having an external diameter of a size slightly greater than the minimum diameter of bores 30 and an internal diameter thereof that is greater than the external diameter of the cap screws 16 so as to positively eliminate any possibility of interference therebetween.

The bushings 32 are to preferably be made of ductile steel although any material possessing qualities of flowing and susceptible of conforming to the bores 30 in the assembly of the cap and base members together prior to the close fitting machining of the aligned openings 18 and 20 in the bearing sections 12 and 144.

So as to permit of ease in the assembly of the bearing members 12 and 14 together as to the reception of the dowel bushings in the bores, chamfers 34 and 36 are provided respectively at the open end of the bores 30 and at the respective ends of the bushings.

The bushings 32 in forming a part of the bearing assembly become such prior to the boring of the main bearing opening 18—20 in that they assure a positive means for properly aligning the bearing cap and base sections together after a machining thereof and wherein normally upon the disassembly of the sections after machining because of the inherent tension in the metal causing a warpage of either one or both of the bearing members 12 and 14 tending to spread the bolt holes apart. The bushings are intended to be press fitted in the bores 30 of the base member with substantially one half the axial length thereof protruding therefrom so as to be received in the bores 30 of the cap member when the cap member is assembled upon the base member 14.

Because of the ductile nature of the bushings, they will permit of a certain degree of flowing ability thereof so as to easily fit into the bores 30 and thus effectively align the base and cap members together as the cap is pressed thereon into assembled relation upon the base. The chamfered nature of bores 30 and bushings 32 permit of ease in the entrance of the bushings into the bores. The cap screws 16 are then inserted into bores 22 and into threaded engagement with threaded portions 26 of bores 24 so as to effectively clamp the cap to the base. It is to be noted in view of the clearance allowed around the cap screws within bores 22 and the opening extending through the bushing that the cap screws 16 solely affect clamping of the cap to the base and the bushings thereby act as the sole medium for providing alignment between the bearing members 12 and 14.

In carrying out the fabrication of the bearing members 12 and 14 through the utilization of the bushings 32 and wherein the stepped bores 22 and 24 are respectively machined in the members 12 and 14, the bushings 32 are pressed into the counterbores 30 of the base member 14 with substantially one-half the axial length of each one extending beyond the planar surfaces 38 of the base member, said planar surfaces adapted to abut planar surfaces 40 formed on the cap member 12. The cap member with its planar surfaces 40 opposing the planar surfaces of the base member is mounted upon the base with the bores 30 thereof receiving the extended portions of the bushings therein. Because of the chamfers 34 and 36 provided respectively at the openings to the bores 30 and upon the ends of the bushings 32, even though the bores are not machined in strict alignment, which machining tolerances are entirely permissible, the bushings will slide over the chamfers 34 and deform in body shape to conform to whatever misalignment there may be between the bores and thus establish, as the cap is press fitted thereon into abutting relation between the surfaces 38 and 40, the initial and subsequent alignment of the cap to the base regardless of warpage caused by machining or servicing between the base and cap members thereafter. As noted in viewing Fig. 4, the bushing distortion is illustrated in somewhat exaggerated condition wherein the bores 30 forming a part of the bores 22 and 24 of the respective cap and base members are not necessarily in either machined alignment or of equal size, thereby requiring the deformation and flowability of the bushings from their true shape to thereby effect an established alignment between the cap and base members. It is thus conceivable because of the guiding operation the bushings affect that a material cost saving is possible permitting of the independent machining of the bores 22 and 24 in the cap and base member without requirement for holding close-tolerance dimensions thereof. No particular cap or base member becomes a positive mate to the other until after an initial assembly therebetween with the bushings 32 arranged therein.

After an assembly of a cap and base member together, the cap screws 16 are inserted into the bores 22, through the opening in the bushing and into threaded engagement with the threaded portion 26 of bore 24 whereupon as they are screwed therein they affect a clamping together of the cap and base members. In the event of a condition wherein the cap member cannot be effectively pressed upon the bushings to abut the base member, the cap screws can be utilized at this time to draw the members 12 and 14 together to cause a deformation or squeezing of the bushing into the bore 30 in cap 12. Fig. 4 clearly discloses that the external surface of the cap screws are clear of the interference with the bore 22 and the opening through the bushing and as such bear no relation to the aligning action of the bushings to the cap and base members.

With the completion of the initial assembly of that cap and base members together the opening 18—20 through the members is machined, said opening being provided for the reception of a bearing or the like therein. It is requisite that the respective openings 18 and 20 be adaptable to alignment to one another for the life use of the members 12 and 14 and to this end the bushings 32 provide medium for assuring same wherein upon the disassembling of the members 12 and 14 from one another after a machining or servicing operation the warpage resulting in the members due to the inherent tension thereof as results from a machining operation spreads the mating bores 30 apart. The relationship of deformation of the bushings 32 to the respective bores 30 is maintained upon the reassembly of the members 12 and 14 after machining or servicing inasmuch as even though the bushings are ductile to an extent to so be deformed initially in assembling the members 12 and 14 together, they have sufficient rigidity as to overcome the warpage tension of the members effective to align the members relative to one another without further distortion of deformation thereof.

Fig. 5 illustrates the broad concept of use of a ductile dowel member 100 for arranging cooperative members 102 and 104 in relation to one another. The member 102 upon which member 104 is arranged in predetermined desired position depending on the requirement of alignment therebetween has a bore 106 therein, the diameter of which is slightly smaller than the external diameter of the dowel member so that the dowel member will slightly deform itself in being press fitted thereon. The member 104 is provided with a bore 108 therein adapted for association with the bore 106 and into which the dowel member is press fitted providing for the arrangement of members 102 and 104 together. As illustrated by Fig. 5 in exaggerated form, the bore 108 is shown as being of a smaller diameter than bore 106 and thus in turn smaller than the external diameter of the dowel member thereby assuring the press fitting and deformation of the dowel member therein. The openings to the bores 106 and 108 are chamfered at 110 and 112 respectively and the opposite ends of the dowel are chamfered at 114. The exact extent of deformation and distortion of the axis of the dowel between the portions of the dowel in the respective bores depends on the machining inaccuracies therebetween as related to the desired alignment positioning between the members 102 and 104. The dowel member 100 as here shown is in the form of a dowel pin of solid cylindrical structure inasmuch as no requirement for passing a bolt therethrough exists as in the case of the bearing assembly of Figs. 1 and 4.

Although the dowel members 30 and 100 respectively are illustrated with regards to specific structural applications, dowel members possessing like qualities of ductility, deformability, and predetermined rigidity are adaptable to a plurality of varied applicational uses as presents itself to any one skilled in the art. The invention is, therefore, to be limited only to the extent of the appended claims.

What I claim is:

1. An assembly of two members comprising a member having one bore therein, a second member arranged in cooperative abutting relation to the first member, having one bore therein, said bore registering with the bore in the first member but with the peripheral wall surfaces thereof out of axial alignment with one another, and a ductile dowel member having a slightly larger diameter than the maximum diameter of any of the bores in either of the members received in press fit deformed relation in the registering bores between the members.

2. A bearing assembly comprising a pair of half section bearing members cooperatively interconnected, each having at least one series of registering bores on each side of the bearing opening between the members, said registering bores having the walls thereof out of true axial alignment, a ductile dowel bushing press fitted in each series of registering bores between the bearing members and a cap screw extending through each series of mated bores and bushings holding the members together.

3. A pair of interconnected members joined together along a common plane passing through the axis of a circular bore formed therebetween comprising a pair of members each having plane surfaces on one side, a semi-circular surface connected with the plane surfaces, and a plurality of bores, one at least on each side of the semicircular surface arranged in perpendicular open relation to and upon the plane surfaces, said members being arranged with their plane surfaces in abutting relation and their respective bores in association with one another, said associated bores being of slightly different diameter to one another, a plurality of ductile material dowel bushings of greater diameter than the diameter of either of the associated bores, one press fitted in each bore of the respective pair of members therebetween, and a plurality of threaded members, one received in each of the bores of the respective members for clamping the members together.

4. A bearing assembly comprising a base member having a semi-circular bearing opening and a pair of stepped bores, one on each side of the opening, the smaller diametered portion of each bore being threaded, a cap member having a semi-circular bearing opening and a pair of stepped bores, one on each side of the opening, assembled in abutting relation upon the base member with the openings of each in communication and the large diametered portions of each bore of the respective members in adjacent associated but imperfect alignment relation, a pair of ductile dowel bushings, one for each set of adjacent bores, press fitted and distorted from their normal shape therein, and a pair of screws, one for each set of bores extending with clearance through the bores in the cap member and bushing into threaded engagement with the threaded portion of the bore in the base member.

5. An assembly of two members requiring alignment therebetween comprising a member having at least a pair of spaced bores therein, a second member cooperatively abutting the first member having a least a pair of spaced bores therein having the openings of which are associated with the openings of the spaced bores in adjacent relation thereto but without strict alignment of the axis of the bores in the respective members to one another, and ductile bushings one received in press fitted deformed position in each of the associated bores extending between and across the abutting zone of the members for establishing a permanent alignment of the members to one another for all subsequent machining, servicing, and disassembly and reassembly of the members.

6. An assembly of two members requiring permanent alignment therebetween regardless of the subsequent machining, disassembly and reassembly thereof comprising a member having a pair of spaced bores therein, a second member arranged in cooperating abutting aligned relation to the first member having a pair of spaced bores of substantially equal diameter to the bores in the first member arranged in adjacent relation thereto but not in strict alignment and a pair of deformable guide members one associated with each adjacent series of bores having an external diameter larger than the diameter of the bores in the members, press fitted in deformed relation in the bores between members, thereby establishing permanent alignment of the members to one another.

7. An assembly of two members requiring permanent alignment therebetween regardless of the subsequent machining, disassembly and reassembly thereof comprising a member having a pair of spaced bores therein, a second member arranged in cooperating abutting aligned relation to the first member having a pair of spaced bores 1 (one) arranged in adjacent relation to the respective bore in the first member but with the peripheral wall portions thereof out of alignment with each other, and a pair of deformable dowel members one associated with each adjacent series of bores having an external diameter larger than the diameter of the bores in the members, press fitted in deformed relation in the bores between the members having its external surface conforming to the misalignment of the bores and establishing permanent alignment of the members to one another.

8. An assembly of two members requiring permanent alignment therebetween regardless of the subsequent machining, disassembly and reassembly thereof comprising a member having a pair of spaced bores therein, a second member arranged in cooperative abutting aligned relation to the first member having a pair of spaced bores of substantially equal diameter to the bores in the first member arranged in adjacent relation thereto but not in strict alignment, and a pair of deformable dowel members one associated with each adjacent series of bores having an external diameter larger than the diameter of the bores in the members, press fitted in deformed relation in the bores between members having its external surface conforming to the misalignment of the bores and establishing permanent alignment of the members to one another, said bores each having chamfers at the openings thereinto, and said deformable members each having chamfers at the end portion thereof.

GUSTAV W. CARLSON.

REFERENCES CITED

The following references are of record in the file of this patent:

UNITED STATES PATENTS

| Number | Name | Date |
|---|---|---|
| 1,647,851 | Bentley | Nov. 1, 1927 |
| 1,801,157 | Howard | Apr. 14, 1931 |
| 1,831,325 | Short | Nov. 10, 1931 |
| 1,831,430 | Weis | Nov. 10, 1932 |
| 1,889,778 | Dobrick | Dec. 6, 1932 |
| 2,006,525 | Thal | July 2, 1935 |
| 2,283,918 | Dekome | May 26, 1942 |
| 2,289,703 | Goerke | July 14, 1942 |
| 2,311,434 | Dusevoir | Feb. 16, 1943 |

FOREIGN PATENTS

| Number | Country | Date |
|---|---|---|
| 290,651 | Italy | Nov. 25, 1931 |